July 20, 1943.  R. MIOLLIS  2,324,636
METHOD AND APPARATUS FOR CHEESE MAKING
Filed Oct. 7, 1941
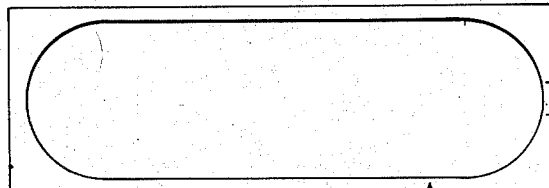
Fig. 1
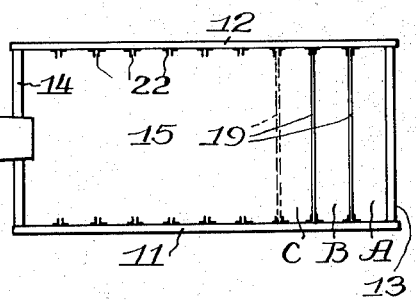
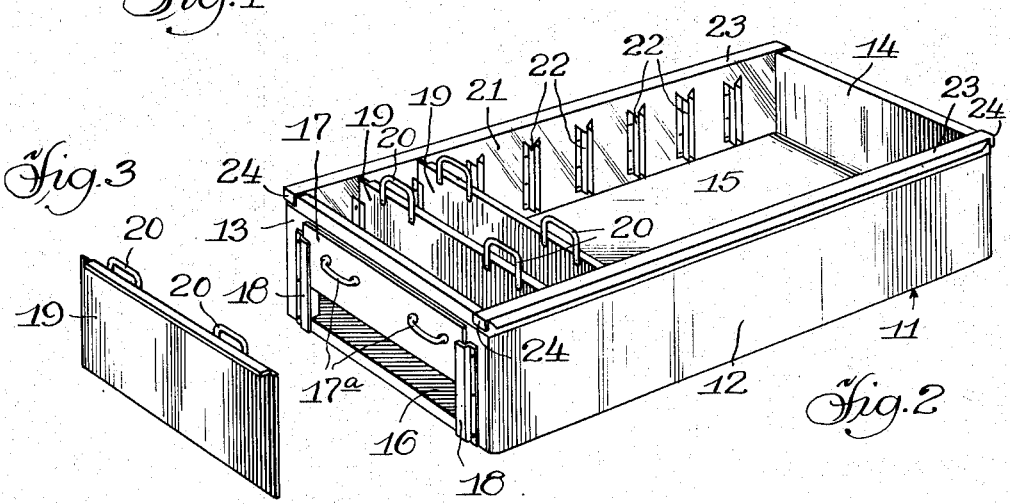
Fig. 3
Fig. 2
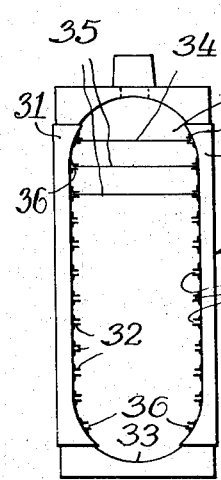
Fig. 6
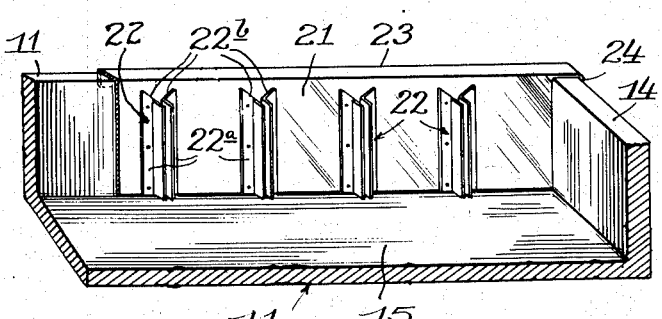
Fig. 4
Fig. 5
Witness:
Chas. L. Loursh
INVENTOR.
Raymond Miollis,
BY Offield Nehlhope Scott + Poole
Attys Patented July 20, 1943

2,324,636

UNITED STATES PATENT OFFICE 2,324,636

METHOD AND APPARATUS FOR CHEESE MAKING

Raymond Miollis, Elmwood Park, Ill.

Application October 7, 1941, Serial No. 413,969

5 Claims. (Cl. 31—47)

This invention relates to improvements in method and apparatus for cheese-making, and has for its principal object to provide a new and improved means and method for making certain types of natural cheese whereby a relatively large batch can be divided into equal subdivisions while in a fluid stage of its manufacture, so that after removal of the whey, such subdivisions will form blocks of substantially the same cheese content, which can then be finally cut or formed in commercial package sizes of substantially uniform size and weight.

In my prior Patent No. 2,103,545 issued December 28, 1937, and my Reissue Patent No. 21,834 issued June 17, 1941, I disclose a new method for the division of a relatively large batch of matted curds into equal or predetermined parts. The principal object of the present invention is to provide a means for dividing a relatively large batch of curds into equal or predetermined parts while the curds are in a loose, fluid stage so that they may be submitted to special treatment before they become matted together. For example, Blue Cheese curds should be seeded with green mold before any matting takes place. The only practical way of preventing matting of the curds in the course of cheesemaking is to leave them in suspension in a large amount of liquid (whey or water). In carrying out my invention I use a vat having non-porous bottom and side walls and provided with removable partitions for dividing the vat into compartments of predetermined size and usually of equal cubical content, said partitions being arranged so that the several compartments can be successively discharged from the vat as individual subdivisions. In the form of apparatus illustrated herein, the dividing vat may consist of a special form of rectangular vat for receiving an entire batch of curds and whey, or it may consist of an ordinary cheese-making vat provided with detachable partition means and special means for supporting said partitions in the proper positions in said vat.

The invention may best be understood by reference to the accompanying drawing, in which Fig. 1 illustrates one form of apparatus embodying my invention including an ordinary cheese vat and a separate dividing vat.

Fig. 2 is an enlarged view showing a separate dividing vat in perspective, with partitions inserted therein.

Fig. 3 is a detail view in perspective showing one of the partitions or dividing members.

Fig. 4 is a fragmentary perspective view showing a section of one side wall of the dividing vat shown in Fig. 2.

Fig. 5 is a detail section taken transversely of the side wall of the dividing vat shown in Figs. 2 and 4.

Fig. 6 is a plan view showing an ordinary cheese vat with side plates and grooves applied directly thereto, whereby the cheese may be initially treated and thereafter divided into individual parts in accordance with my invention.

Referring now to details of the embodiment of the invention illustrated in Figs. 1 to 5, both inclusive, the cheese vat indicated generally at 10 in Fig. 1 is of the usual form heretofore employed to receive milk or cream in large quantities for mechanical treatment in the usual manner, depending upon the nature or type of cheese to be made. After initial treatment in the vat 10, the entire batch is transferred to a dividing vat 11 which is generally rectangular in shape and preferably disposed with its bottom in a generally horizontal plane.

The dividing vat 11 has side walls 12, 12, end walls 13 and 14, and an integral bottom wall 15, all of which walls are preferably imperforate excepting one end wall 13 which has a discharge opening 16 near the bottom thereof. In the form shown, said discharge opening is relatively wide and extends to the bottom wall 15. Said discharge opening may be closed by a suitable gate 17 which in the form shown is slidable vertically in upright guides 18, 18 attached to the outer face of the end wall 13. The gate may also have handles 17ª, 17ª to assist in its operation.

A plurality of removable upright partitions 19, 19, one of which is shown in detail in Fig. 3, are provided for placement at predetermined spaced relation from each other within the vat 11 so as to form individual compartments of predetermined size, usually of equal cubical content. Said partitions 19, 19 are preferably made of sheet metal, and each has a pair of handles 20, 20 on its upper edge. Two of such partitions are usually sufficient for dividing the entire batch into predetermined subdivisions or portions as will presently appear.

In the form shown in detail in Figs. 2, 4 and 5, the spacing means for the upright partitions 19 consist of a pair of removable side wall plates 21, each of which fits along the inner surface of one of the opposite side walls 12, 12 and has a series of vertical grooves 22, 22 carried thereon. In the form shown, each of said grooves consists of a pair of opposed L-shaped metal pieces 22ª suitably attached to the inner face of the side plates 21, and preferably having their upper edges formed in V-shape as indicated at 22b to assist in inserting the partitions 19 therebetween.

For convenience in holding the side plates 21, 21 in proper relation to the vat, said plates may be provided with flanged upper edges 23, 23 which fit over the top of the side walls 12, 12. Said side plates may also be positioned against endwise displacement by flanged end extensions 24, 24 at the top of said plates which fit over the corners of the vat as clearly shown in Fig. 2. The provision of separate side plates 21, 21 as above described permits their periodical removal from the vat for cleaning of the vat walls as well as of the plates themselves. These removable side plates also give the added advantage of permitting substitution of other side plates with grooves spaced at different intervals so as to form separate compartments of greater or less predetermined capacity as desired.

The apparatus above described is utilized substantially as follows: The batch of curds and whey may be transferred as a whole from the cheese vat 10 into the molding vat 11 in any suitable manner, and the whole batch of curds and whey is stirred uniformly so that every cubic foot of liquid contains a homogeneous amount of curd in suspension. The partitions 19, 19 are then placed in the first two pairs of grooves 22, 22 near the discharge end of the dividing vat shown in Figs. 1 and 2, thus forming two compartments indicated at A and B, respectively. The contents of the first compartment A between the vat gate 17 and the first partition are then released by opening said gate and discharging said contents into any suitable container for further individual treatment.

The contents of the second compartment B may then be released by removing the first partition which is placed immediately in the third pair of grooves, thereby forming a third compartment indicated at C separated from the remaining batch of curds and whey. This process of discharging the contents of successive subdivisions or compartments continues until all the curds and whey are removed from the vat.

During the course of the operation a small amount of whey may seep out between the ends of the partitions and the vat. Such loss of whey, however, is immaterial as long as there is enough left in the last compartment to prevent matting of the curd.

The curd does not escape between partitions and vat because the pressure behind the partitions has a tendency to pack some curds around the edges of the partitions, which prevents the loss of curds and excessive loss of whey. While the partitions may be so built that they will be water-tight, I find that in practice there is ample time for the treatment of every subdivision of curds before the last compartment is emptied and retaining the desired loose fluid condition of the curds and whey in the last compartment. It will be understood from the above that the primary object of the dividing or separating method hereinabove described is to insure substantially equal or predetermined amounts of curd in each subdivision, and permit the discharge of each subdivision before any matting takes place.

In the modified form of apparatus illustrated in Fig. 6, my novel method of separating the batch into equal subdivisions is shown as applied to an ordinary cheese vat 30 having rounded ends as shown. In this case the vat is provided with removable side plates 31 similar to that employed in connection with the form of dividing vat 11, but said side plates each have end portions curved to fit along the corresponding curved end walls of the vat as shown. Upright groove members 32, 32 are disposed at predetermined spaced intervals along said side plates 21, 21. These spaced intervals may be substantially equal along the intermediate straight portions of the side walls 21, 21, but where the said side walls are curved as indicated at 33, 33 the grooves are positioned at such widened intervals as are carefully determined to give all of the compartments a predetermined cubical content which ordinarily will be equal. In addition, of course, one or more special end partition members 34 shorter than the intermediate partitions 35, 35 should be provided to fit between the end grooves 36, 36 at both ends of the vat.

Although I have shown and described certain forms of apparatus and methods for carrying out my invention, it will be understood that I do not wish to be limited to the exact construction and methods shown and described, but that various changes and modifications may be made without departing from the spirit and scope of my invention as defined in the appended claims.

I claim as my invention:

1. The method of making natural cheese which includes treating a relatively large batch of milk or the like to form curds and whey, supporting said batch in a non-porous vat while said batch is in a fluid state, inserting upright partitions in said vat while said curds are distributed substantially equally throughout the area of said batch, said partitions being so located that a plurality of compartments will be formed, each containing a predetermined fraction of the curds in the original whole batch, and successively releasing curds and whey from each of said compartments so as to empty individually the several compartments formed by said upright partition members.

2. The method of making natural cheese which includes treating a relatively large batch of milk or the like to form curds, supporting said batch in a vat while said batch is in a fluid state, inserting a plurality of upright partition members in said vat while the curds of said batch are distributed substantially equally throughout the area of the vat, whereby said partition members will form a plurality of individual compartments in said vat each containing a substantially equal amount of curds, opening one end wall of said vat, and thereafter successively removing each of said upright partition members which is nearest the open end of the vat so as to empty individually the several compartments formed by said upright partition members from the said open end of the vat.

3. The method of making natural cheese which includes treating a relatively large batch of milk or the like to form curds, supporting said batch in a vat while said batch is in a fluid state, inserting a pair of upright partition members transversely of said vat near one end thereof and in parallel relation with each other while the curds of said batch are distributed substantially equally throughout the area of the vat whereby said partition members will form a plurality of individual compartments in said vat, each containing a substantially equal amount of curds, opening the end wall of said vat nearest said partitions, and thereafter alternately transferring each one of the two partition members which may be temporarily disposed nearest the open end of said vat into a similar parallel upright position beyond the other partition member whereby each such transfer of a partition member will permit the individual emptying of a compartment nearest the open end of the vat and will form another compartment containing a substantially equal amount of curds adapted for emptying individually by the next subsequent transfer of the partition member then nearest the open end of the vat.

4. The method of making natural cheese which includes treating a relatively large batch of milk or the like to form curds, horizontally supporting said batch in a rectangular vat while said batch is in a fluid state whereby its upper surface will assume a level parallel with the bottom horizontally supported surface of said batch, inserting a plurality of upright partition members transversely of said vat while the curds of said batch are distributed substantially equally throughout the area of the vat, whereby said partition members will form a plurality of individual compartments in said vat each containing a substantially equal amount of curds, opening one end wall of said vat, and thereafter successively removing each of said upright partition members which is nearest the open end of the vat so as to empty individually the several compartments formed by said upright partition members from the said open end of the vat.

5. In an apparatus for making natural cheese, a vat of a size adapted to contain a relatively large batch of curds and whey and having closed side, end and bottom walls adapted to maintain the batch in a fluid state, one of the end walls having a discharge opening therein and a closure member therefor, and the side walls having a series of upright grooves formed therein, and a plurality of upright partitions removably mounted in said vat in parallel relation with each other, with their opposite ends retained in liquid-tight relation in said grooves, the arrangement of said grooves and upright partitions being such that individual fluid-retaining compartments of equal cubical content will be formed between said upright partitions when the latter are disposed in adjacent pairs of grooves.

RAYMOND MIOLLIS.